(12) United States Patent
Tsaparas et al.

(10) Patent No.: US 8,990,124 B2
(45) Date of Patent: Mar. 24, 2015

(54) ASSESSING QUALITY OF USER REVIEWS

(75) Inventors: Panayiotis Tsaparas, San Francisco, CA (US); Yue Lu, Urbana, IL (US); Alexandros Ntoulas, Mountain View, CA (US); Livia Polanyi, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 435 days.

(21) Appl. No.: 12/687,127

(22) Filed: Jan. 14, 2010

(65) Prior Publication Data

US 2011/0173191 A1 Jul. 14, 2011

(51) Int. Cl.
*G06Q 30/00* (2012.01)
*G06F 17/30* (2006.01)
*G06Q 30/02* (2012.01)

(52) U.S. Cl.
CPC .......... *G06F 17/30616* (2013.01); *G06Q 30/02* (2013.01)
USPC .......................................... 705/347; 707/748

(58) Field of Classification Search
None
See application file for complete search history.

(56) References Cited

U.S. PATENT DOCUMENTS

| 7,363,214 | B2 | 4/2008 | Musgrove et al. | |
|---|---|---|---|---|
| 2005/0256866 | A1* | 11/2005 | Lu et al. | 707/5 |
| 2006/0123000 | A1* | 6/2006 | Baxter et al. | 707/5 |
| 2007/0078670 | A1 | 4/2007 | Dave et al. | |
| 2007/0174249 | A1 | 7/2007 | James | |
| 2007/0192169 | A1* | 8/2007 | Herbrich et al. | 705/10 |
| 2007/0214121 | A1* | 9/2007 | Ebanks | 707/3 |
| 2008/0195480 | A1* | 8/2008 | Calabria | 705/14 |
| 2008/0249764 | A1* | 10/2008 | Huang et al. | 704/9 |
| 2009/0063247 | A1* | 3/2009 | Burgess et al. | 705/10 |
| 2009/0063630 | A1* | 3/2009 | Obasanjo et al. | 709/204 |
| 2009/0144272 | A1* | 6/2009 | Adarsh et al. | 707/5 |
| 2009/0157490 | A1* | 6/2009 | Lawyer | 705/11 |
| 2009/0157667 | A1* | 6/2009 | Brougher et al. | 707/5 |
| 2009/0240652 | A1 | 9/2009 | Su et al. | |
| 2009/0249451 | A1* | 10/2009 | Su et al. | 726/5 |
| 2009/0265332 | A1* | 10/2009 | Mushtaq et al. | 707/5 |
| 2009/0299824 | A1* | 12/2009 | Barnes, Jr. | 705/10 |
| 2009/0319342 | A1* | 12/2009 | Shilman et al. | 705/10 |
| 2010/0153404 | A1* | 6/2010 | Ghosh et al. | 707/748 |
| 2011/0029926 | A1* | 2/2011 | Hao et al. | 715/835 |
| 2011/0109435 | A1* | 5/2011 | Bickel et al. | 340/8.1 |

OTHER PUBLICATIONS

"REVRANK: A Fully Unsupervised Algorithm for Selecting the Most Helpful Book Reviews," by Tsur and Rappoport. In: Proc. of the Third Int'l ICWSM Conf. (May 17-20, 2009). Available at: http://eprints.pascal-network.org/archive/00006813 Last visited: Nov. 7, 2011.*

"Using Trust and Provenance for Content Filtering on the Semantic Web," by Golbeck & Mannes. In: Proc. of the Models of Trust for the Web Workshop at WWW, 2006. Available at: http://www.ra.ethz.ch/CDstore/www2006/www.l3s.de/~olmedilla/events/MTWO6_papers/paper29.pdf.*

(Continued)

*Primary Examiner* — Daniel Kinsaul

(74) *Attorney, Agent, or Firm* — Dan Choi; Judy Yee; Micky Minhas

(57) ABSTRACT

User generated reviews and scores associated with the reviews may be used to train a review scoring model with textual features of the reviews. The review scoring model may be used to predict scores for newly received reviews. One or more constraints based on social networking application data associated with an author of a review may be used to adjust the predicted score of the review.

15 Claims, 5 Drawing Sheets

(56) References Cited

OTHER PUBLICATIONS

"Predicting trusts among users of online communities: an epinions case study," by Haifeng et al. In: Proc. 9th ACM Conf. on Electronic Commerce (2008). Available at: ACM.*

"Trust-Aware Collaborative Filtering for Recommender Systems," by Massa & Avesani. In: Lecture Notes in Computer Science vol. 3290, 2004, pp. 492-508 (2004). Available at: SpringerLink.*

"Propagation of Trust and Distrust," by Guha et al. in: Proc. 13$^{th}$ Int'l Conf. WWW (2004). Available at: ACM.*

"PageRank for Ranking Authors in Co-citation Networks," by Ding et al. In: J'nl American Society for Information Science and Technology (2009). Available at: Wiley Onlin.*

Lundquist, Doug, "The Hidden Problem of Uninformed Online Product Reviewers", Retrieved at <<http://ieeexplore.ieee.org/stamp/stamp.jsp?arnumber=04624807>>, Proceedings of the 2008 19th International Conference on Database and Expert Systems Application, Sep. 1-5, 2008, pp. 739-743.

Zheng, et al., "Social Network Collaborative Filtering", Retrieved at <<http://archive.nyu.edu/bitstream/2451/23407/2/CeDER-07-04.pdf>>, Sep. 14, 2007, pp. 7.

Zhang, Zhu, "Weighing Stars: Aggregating Online Product Reviews for Intelligent E-commerce Applications", Retrieved at <<http://ieeexplore.ieee.org/stamp/stamp.jsp?arnumber=04629725>>, IEEE Intelligent Systems, vol. 23, Issue 5, Sep. 2008, pp. 42-49.

Ghose, et al., "Estimating the Socio-Economic Impact of Product Reviews: Mining Text and Reviewer Characteristics", Retrieved at <<http://archive.nyu.edu/bitstream/2451/27680/2/CeDER-08-06.pdf>>, Sep. 1, 2008, pp. 1-26.

* cited by examiner

ASSESSING QUALITY OF USER REVIEWS

BACKGROUND

On many online portals or merchant websites, users generate and post reviews about products and services. For example, a user may write a review of a digital camera along with a rating such as four stars. While user generated reviews are helpful, the quality of the reviews may vary. For example, some reviews may have many misspellings, may consist of only a few words, may include profanity, or may be spam and have nothing to do with the associated product. To help users filter out the low quality reviews, many online portals may allow other users to rate or comment on the quality of reviews. For example, a user may give a review a "thumbs up" or "thumbs down", or may give the review a numerical score based on the perceived quality of the review. Other users may then only be showed reviews having high quality ratings, may choose to only see reviews of high quality, or may be shown reviews in order of perceived quality.

However, the above described solutions have several problems. One such problem is with how to treat reviews that have no ratings. For example, a review may have just been posted and may not have been rated yet, or a review may be for a product that is new or not popular and may not have received any reviews. Another problem is that users may score reviews not based on the quality of the review, but based on their agreement with the opinions expressed by the review. For example, a user may give a "thumbs down" to all negative reviews for a particular product, regardless of the actual quality of the review. Further, many websites now aggregate reviews from a plurality of review websites, and it is difficult to determine scores for the aggregated reviews and to integrate the scores of reviews from different review websites.

SUMMARY

User generated reviews and scores associated with the reviews are used to train a review scoring model with textual features of the reviews. The review scoring model may then be used to predict scores for newly received reviews. In addition, one or more constraints based on social networking application data associated with an author of a review may be used to adjust the predicted score of the review.

In an implementation, a review is received at a computer device through a network. The review may have an associated author. Metadata associated with the author is received at the computer device through the network. A feature vector for the review is determined based on the text of the review by the computer device. A score is determined for the review based on the determined feature vector and the metadata associated with the author by the computer device.

Implementations may include some of the following features. Determining a feature vector for the review may include performing at least one of a text-statistics based analysis, a syntactic analysis, conformity-based analysis, a sentiment-based analysis, or a feature-based analysis. Determining a score for the review based on the determined feature vector and the metadata associated with the author may include determining a score for the review using the feature vector and a review scoring model, and applying one or more constraints to the determined score based on the metadata associated with the author. The one or more constraints may be one or more of author consistency constraints, link consistency constraints, co-citation constraints, and trust consistency constraints. The metadata may include social networking data. The social networking data may include a number of nodes that are connected to a node associated with the author. The social networking data may include a representative review score of authors associated with nodes that are connected to a node associated with the author.

In an implementation, a plurality of reviews is received through a network by a computer device, wherein each review has an associated author and an associated score. Metadata associated with each author associated with a review from the plurality of reviews is received through the network by the computer device. A feature vector is generated for each review from the plurality of reviews using the received metadata associated with the author of the review and the text of each review by the computer device. A review scoring model is trained using the feature vector for each review from the plurality of reviews and the associated scores by the computer device.

Implementations may include some or all of the following features. A review may be received. The review may be a review other than the reviews from the plurality of reviews. A feature vector for the review may be determined. A score may be generated for the review using the feature vector for the review and the review scoring model. Metadata associated with the received review may be received. One or more constraints may be applied to the generated score using the received metadata and the metadata associated with each author associated with the plurality of reviews. The constraints may be one or more of author consistency constraints, link consistency constraints, co-citation constraints, and trust consistency constraints. The metadata may be social networking data. The metadata may be an average review score for the author, the authors that link to or are associated with the author, and/or the review scores of authors that link to or are associated with the author. A feature vector may be determined for each review from the plurality of reviews using the received metadata associated with the author of the review and the text of each review and comprises determining a value for at least one text feature based on the text of each review. The text features may include at least one of text statistics features, syntactic analysis features, conformity based features, sentiment based features, or product feature based features.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
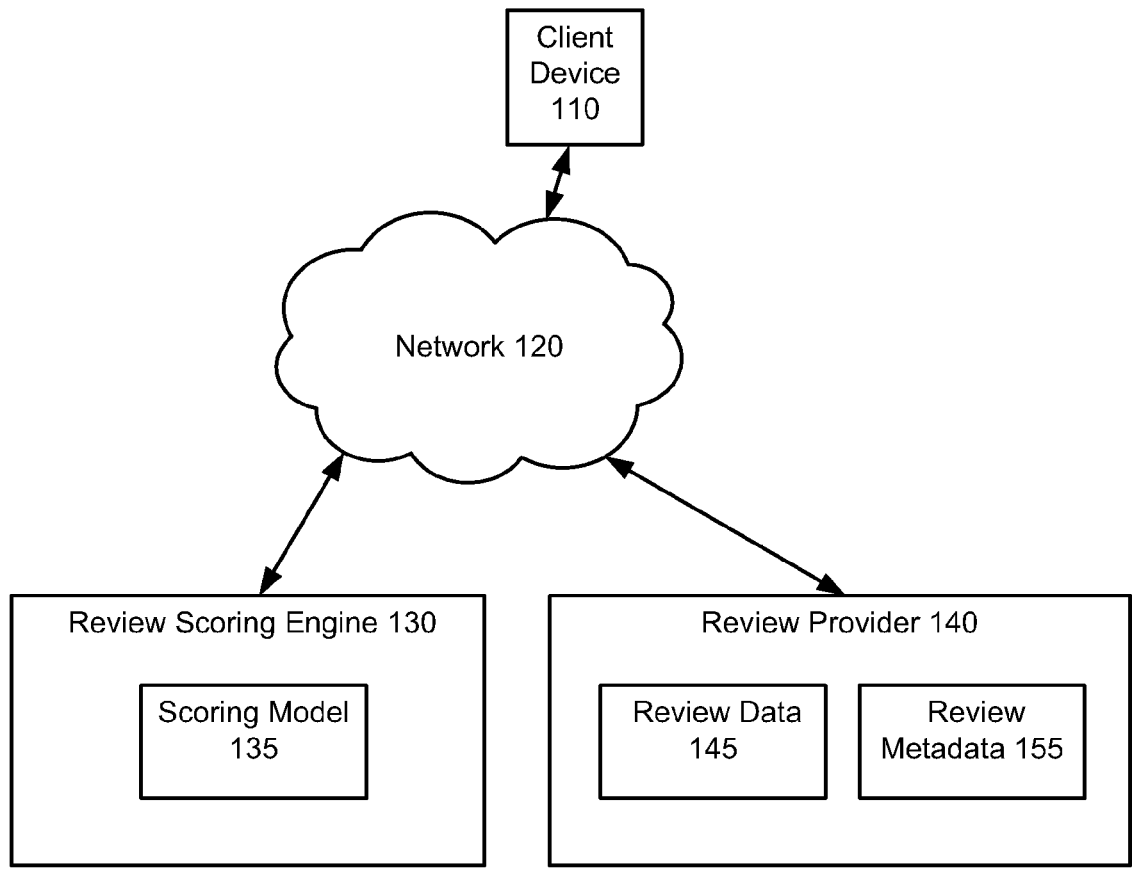
FIG. 1 is an illustration of an example environment for the training and use of a model for the generation of scores for reviews.

FIG. 1 is an illustration of an example environment 100 for the training and use of a model for the generation of scores for reviews. In some implementations, the model may automatically generate a score for a review based in part on a textual analysis of the review, and in part on metadata associated with the review and/or an author of the review. The metadata may include scores of other reviews written by the author, as well as social networking data such as the number of users who trust the author and the scores of reviews written by users who trust the author, for example.

As illustrated, the environment 100 may include a client device 110 and a review provider 140. A user may use the client device 110 to connect to the review provider 140 and view one or more reviews associated with one or more products and services. In addition, the user may generate and submit a review to the review provider 140. The client device 110 and the review provider 140 may each be implemented using one or more computer devices such as the computing device 500 described with respect to FIG. 5, for example. The client device 110 and the review provider 140 may communicate through a network such as the network 120. The network 120 may be a variety of network types including the public switched telephone network (PSTN), a cellular telephone network, and a packet switched network (e.g., the Internet).

In some implementations, the review provider 140 may comprise review data 145 stored in a storage device or memory, for example. The review data 145 may be comprised within a data structure, such as a table for example, that stores one or more user generated reviews. Each entry in the review data 145 may include a unique identifier of the review, the text of the review, an indicator of an author of the review, an indicator of the product or service that the review purports to describe, and/or a score or ranking of the review generated by other users. In addition, the review data 145 may include a category or genre associated with the product that the review purports to describe. In some implementations, the score for a review may be a numerical score in a defined range (e.g., 1 through 5, etc.). In other implementations, the score may be a binary score (e.g., "Yes" or "No", etc.) indicating the overall helpfulness or quality of the review. Other scores and scoring systems may be used.

The review provider 140 may comprise review metadata 155. The review metadata 155 may include a variety of data that describes the reviews in the review data 145 as well as the authors associated with the review data 145. In some implementations, the review metadata 155 may include the scores and/or the average score of the reviews associated with an author. For example, if the author has written two reviews that were both given scores of 4 by other users, this may be reflected in the review data 145. Other metadata may include the number of reviews submitted by an author, a date of the last or a previous review submitted by an author, and/or a frequency with which the author submits reviews (e.g., once a week, once a month, etc.), for example.

In some implementations, the review metadata 155 may include what is referred to herein as social networking data. The social networking data may describe a relationship between an author and other authors of reviews from the review data 145. For example, the review provider 140 may allow authors to follow other authors, to indicate which authors that they trust, and/or to indicate which authors are their friends.

Accordingly, the review metadata 145 may include, for each author, a list of nodes that represent other authors that the author trusts and authors that the author is "friends" with. The review metadata 145 may further include, for each author, an average score or rating for each user or author. As will be discussed further below, the ratings associated with nodes representing authors who an author trusts, or is friends with, may be indicative of the quality of reviews generated by the author.

The environment 100 may further comprise a review scoring engine 130. The review scoring engine 130 may train and maintain a model (e.g., a scoring model 135) that automatically scores reviews based on the text of the review as well as metadata associated with the review or associated with the author of the review. The review scoring engine 130 may be implemented by a computer device such as the computing device 500 described with respect to FIG. 5, and may communicate with the review provider 140 through the network 120. In other implementations, the review scoring engine 130 may be implemented as a component of the review provider 140.

The review scoring engine 130 may receive a subset of the review data 145 and the review metadata 155. The subset of the review data 145 and the review metadata 155 may be used to train the scoring model 135 to generate a score for a review based on the text of the review and metadata associated with the review and/or the author of the review. The metadata may further include social networking data, for example.

As will be described further with respect to FIG. 2, in some implementations, the scoring model 135 may comprise a set of weights with a weight associated with each of one or more text based metrics and/or each of one or more metadata based metrics. The review scoring engine 130 may train the scoring model 135 by adjusting the weights to accurately predict the review scores of the reviews from the subset of the review data 145. The trained scoring model 135 may be used by the review scoring engine 130 to score new reviews or reviews that were not part of the subset of review data 145 used to train the scoring model 135. The score for a review generated by the trained scoring model 135 may then be associated with the review and displayed with the review by the review provider 140, for example.

In some implementations, the review scoring engine 130 may further train the review scoring model 135 using reviews (e.g., review data 145) from a first domain or website, and metadata from a second domain or website. For example, the first domain may include several user generated scores or reviews and little or no metadata such as social networking data. The second domain may include extensive metadata. In order to train the review scoring model 135 using the reviews of the first domain and the metadata from the second domain, the review scoring model may map the reviews from the first domain to likely authors from the second domain. Because users tend to generate reviews for a variety of websites or domains it may be likely that there is a reviewer from the first domain in the second domain. Moreover, many reviewers tend to "cut and paste" reviews from one domain to another, or at least maintain a consistent style or tone. The mapping of the reviews may be done by performing textual analysis of the reviews in the first domain against the reviews of the second domain to identify reviews of the first and second domain that are similar. Authors of the first domain who have reviews that are similar to authors of the second domain may be mapped together. The review scoring model 135 may then be trained using the text of the reviews from the first domain and the metadata of the authors from the second domain.

Figure 2:
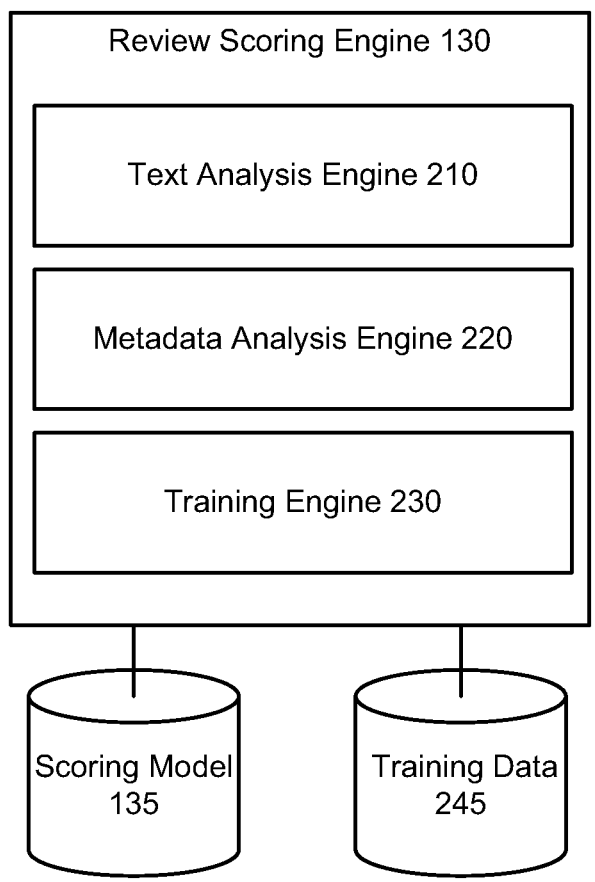
FIG. 2 is block diagram of an implementation of an example review scoring engine.

FIG. 2 is block diagram of an implementation of an example review scoring engine 130. As illustrated, the scoring engine 130 may comprise several components including a text analysis engine 210, a metadata analysis engine 220, and a training engine 230. The review scoring engine 130 may also generate and access data including the scoring model 135 and training data 245, for example, from storage.

The text analysis engine 210 may analyze the text of a user review and generate values or scores for one or more text based features. In some implementations, the text features may comprise text statistics. The text statistics may comprise statistics such as the number of words in the review, number of paragraphs in the review, etc. The statistics may further comprise the number of capital letters in the review as well as the average length of each sentence or paragraph, for example. The text statistics may be determined using a variety of well known textual analysis techniques.

In some implementations, the text features may comprise syntactic-text features. The syntactic-text features may be features related to the parts of speech associated with each word in the review. For example, text analysis engine 210 may determine the number of nouns, adverbs, verbs, and/or adjectives in the review. The text analysis engine 210 may determine the frequency of each part of speech in the review. The syntactic features may be identified by the text analysis engine 210 using a variety of well known syntactic analysis techniques.

In some implementations, the text features may comprise conformity features. The conformity features may be a measure of how the review compares to the style of other reviews in the review data 145, or to reviews that have been flagged, identified, or selected as model or expert reviews. In some implementations, the conformity features may be determined by the text analysis engine 210 by measuring the KL-divergence between the feature vector of the review and the other reviews. Other methods may also be used.

In some implementations, the text features may comprise sentiment features. The sentiment features may be based on a number of positive or negative words found in a review, or a ratio of positive and negative words in a review to the overall number of words in the review, for example. A review having a large ratio or a high or predetermined number of positive and/or negative words may be indicative of a review of high quality because the review is likely to provide information that may help another user make a purchasing decision. In some implementations, the sentiment features may be determined by the text analysis engine 210 using one or more lists of negative and/or positive words, for example.

In some implementations, the text features may comprise product features. The product features may be a measure of the number of times a particular feature and/or name of the product that is associated with the review is mentioned. A review that refers to name of the product it purports to review and/or the features of that product may be of a higher quality than a review that does not mention the name of the product or product features. In some implementations, the product features may be determined by the text analysis engine 210 using a list of features associated with each product, for example.

The metadata analysis engine 220 may analyze metadata associated with a review or an author of a review and may generate values or scores for a review for various metadata features. In some implementations, the metadata features may comprise author-based metadata features. The author-based metadata features may describe various statistics regarding the author and other reviews generated by the author. Examples of author-based features include the number of reviews submitted by the author and an average review score for the author, for example. Other author features may also be used.

In some implementations, the metadata features comprise social networking features. The social networking features may comprise features associated with the author in a social networking system or environment. Examples of social networking features may be the number of nodes representing other authors that trust the author, the number of nodes representing other authors that are friends with the author, or are connected with a node associated with the author through a link, the number of other nodes representing authors that the author is friends with or trusts, and the overall page rank of the node representing the author in the social network, for example. Other features associated with social networks or social networking applications may be used.

The training engine 230 may train and/or generate the review scoring model 135 using a subset of the review data 145 and/or review metadata 155. The subset of the review data 145 and/or review metadata 155 may be stored as the training data 245.

In some implementations, the training engine 230 may train the scoring model 135 by generating a set of text features using the text of the reviews from the training data 245. The text feature values may be determined by the text analysis engine 210 as described above.

In some implementations, the training engine 230 may train the scoring model 135 by generating a set of metadata features from the training data 245. The metadata features may be generated by the metadata analysis engine 220 as described above. Together, the generated text features and/or the metadata features for a review may be referred to herein as a feature vector.

In an implementation, the training engine 230 may train the scoring model 135 using the feature vectors for each review in the training data 245 by adjusting a weight associated with each feature in the scoring model 135, such that the scoring model 135 is able to predict the score associated with a review from the training data 245 given the feature vector associated with the review. In some implementations, a set of weights W may be determined using a linear regression according to Equation (1), where $X_i$ may represent a set of feature vectors for a review i having the score $Y_i$:

$$f_0(W) = \sum_i (W'X_i - Y_i)^2 \quad (1)$$

The scoring model 135 may be trained using only the text features, only the metadata features, or some combination of both, in an implementation. By training the scoring model 135 using only the text features, the scoring model 135 may be more broadly applied in that the scoring model 135 may be used to predict the score of reviews having unknown authors or reviews that lack metadata. As described further below, the metadata features may be taken into consideration through the use of metadata constraints on the scoring model 135.

The review scoring engine 130 may determine a feature vector for a received review, and use the scoring model 135 to determine a score for the review. In some implementations, the feature vector may only include text-based features, and the review scoring engine 130 may incorporate the metadata features associated with the review, if any, through one or more metadata constraints on the scoring model 135.

In some implementations, the metadata constraint is an author consistency constraint. The author consistency constraint is based on the principle that an author tends to generate reviews of a consistent quality. Therefore, a predicted score for a review by the scoring model 135 may be adjusted or skewed to be close to the average score associated with the author. The average score for an author may be known (e.g., part of the metadata), or estimated, for example. In some implementations, the author consistency constraint may be incorporated into the review scoring engine 130 using Equation (2), where $A_{ij}$ may be set to 1 if two authors $A_i$ and $A_j$ of reviews i and j are the same and 0 if the authors are different or if one of the authors is unknown:

$$f_1(W) = \sum_i (W'X_i - Y_i)^2 + \beta \sum_{i,j} A_{ij}(W'X_i - W'X_j)^2 \quad (2)$$

In some implementations, the metadata constraint may be a trust-consistency constraint. The trust-consistency constraint is based on the principle that if an author A trusts an author B, the reviews of author B are probably at least the same quality as the reviews of author A if not higher. Therefore, a predicted score for a review by the review scoring model 135 for an author may be adjusted or skewed to be close to the average score associated with the authors that the author trusts. In some implementations, the trust consistency constraint may be incorporated into the review scoring engine 130 using Equation (3), where $Q(x)$ represents the average quality score of an author x and $T_{xy}$ is 1 if the authors x and y trust each other and 0 if the authors do not trust each other:

$$f_1(W) = \sum_i (W'X_i - Y_i)^2 + \gamma \sum_{x,y} T_{xy}(\max\{0, Q(x) - Q(y)\})^2 \quad (3)$$

In some implementations, the metadata constraint may be a co-citation-consistency constraint. The co-citation-consistency constraint is based on the principle that if an author A is trusted by an author B, and an author C is trusted the author B, then reviews by author A and reviews by author C may have at least the same quality. Therefore, a predicted score for a review by the scoring model 135 for an author may be adjusted or skewed to be close to the average score of authors who are trusted by the same common author. In some implementations, the co-citation-consistency constraint may be incorporated into the review scoring engine 130 using Equation (4), where $Q(x)$ represents the average quality score of an author x and $C_{xy}$ is 1 if the authors x and y have a common author who trusts both of them, and 0 otherwise:

$$f_2(W) = \sum_i (W'X_i - Y_i)^2 + \delta \sum_{x,y} C_{xy}(Q(x) - Q(y))^2 \quad (4)$$

In some implementations, the metadata constraint may be a link-consistency constraint. The link consistency constraint is based on the principle that if two authors are connected to each other in the social network through nodes associated with each author (i.e., trust, friends, etc.), then the two authors may have reviews of the same score or quality. In accordance with this constraint, a predicted score for a review by the scoring model 135 for an author may be adjusted or skewed to be close to the average score associated with the authors that the author is linked to or connected to. In some implementations, the link consistency constraint may be incorporated into the review scoring engine 130 using Equation (5), where $Q(x)$ represents the average quality score of an author x and $L_{xy}$ is 1 if the authors x and y are linked to each other and 0 if the authors are not linked to each other:

$$f_3(W) = \sum_i (W'X_i - Y_i)^2 + \lambda \sum_{x,y} L_{xy}(Q(x) - Q(y))^2 \quad (5)$$

The consistency principles described herein may be selectively applied separately, together, or in any combination. Taken together, the consistency principles may be applied together (e.g., alone or in combination) using Equation (6) for example, where the variables $\lambda$, $\beta$, $\gamma$, $\delta$ may be selectively used by the review scoring engine 130 to change the weight of each of the consistency principles:

$$\begin{aligned}f(W) = &\sum_i (W'X_i - Y_i)^2 + \lambda \sum_{x,y} L_{xy}(Q(x) - Q(y))^2 + \delta \sum_{x,y} C_{xy}(Q(x) - Q(y))^2 + \\ &\gamma \sum_{x,y} T_{xy}(\max\{0, Q(x) - Q(y)\})^2 + \beta \sum_{i,j} A_{ij}(W'X_i - W'X_j)^2\end{aligned} \quad (6)$$

In some implementations, the consistency constraints described above may be used by the review scoring engine 130, along with the scoring model 135, to generate a score for a review based on text features of the review. By incorporating the metadata features described above into the scoring model 135 through the consistency constraints rather than as features with associated weights, the review scoring engine 130 may be used to generate scores for reviews that have no known author or lack metadata using the scoring model 135.

Figure 3:
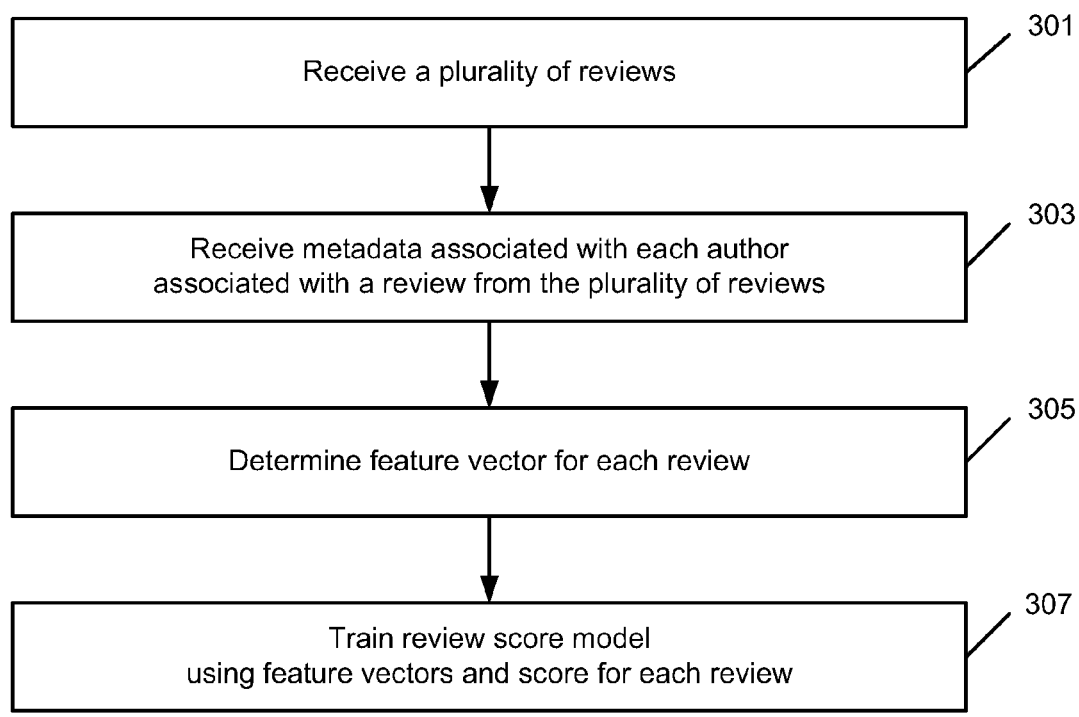
FIG. 3 is an operational flow of an implementation of a process for training a review scoring model.

FIG. 3 is an operational flow of an implementation of a process 300 for training a review scoring model. The process 300 may be performed by the review scoring engine 130, for example.

A plurality of reviews is received (301). The plurality of reviews may be received by the review scoring engine 130 from the review provider 140. Each review in the plurality of reviews may be associated with an author and a score. The score may reflect the perceived quality of the review and may have been generated by other users or authors, or by a professional reviewer or administrator, for example. The reviews may comprise a training set of reviews that have been selected from the review data 145 for training the scoring model 135.

Metadata associated with each author associated with a review from the plurality of reviews is received (303). The metadata may be received by the review scoring engine 130 from the review provider 140. In some implementations, the metadata comprises social networking data associated with the author. For example, the metadata may describe friends of the author and/or authors whose reviews the author trusts.

A feature vector may be determined for each review from the plurality of reviews (305). The feature vectors may be determined by the text analysis engine 210 and/or the metadata analysis engine 220, for example. In some implementations, the feature vector may only include text based features. The text based features may be determined from the text of each review by the text analysis engine 210 and may include text-statistics features, syntactic analysis features, conformity based features, sentiment based features, and/or product feature based features, for example. Other types of text features may be generated.

In some implementations, the feature vectors may also include metadata features. The metadata features may be generated by the metadata analysis engine 220 using the received metadata and may include an average review associated with each review author, and a page rank of a node associated with the author in a social networking system, or the number of nodes associated with other authors who are connected to the node associated with the author, for example.

A review scoring model is trained using the feature vectors and score for each review (307). The review scoring model (e.g., scoring model 135) may be trained by the review scoring engine 130. In some implementations, the review scoring model may include a set of weights corresponding to the features in the feature vectors, and the review scoring model may be trained by adjusting the weights associated with the features such that the review scoring model may predict the score associated with a review from the plurality of reviews using the feature vector associated with the review. In some implementations, the weights may be determined by the review scoring engine 130 using linear regression. Other methods may also be used.

Figure 4:
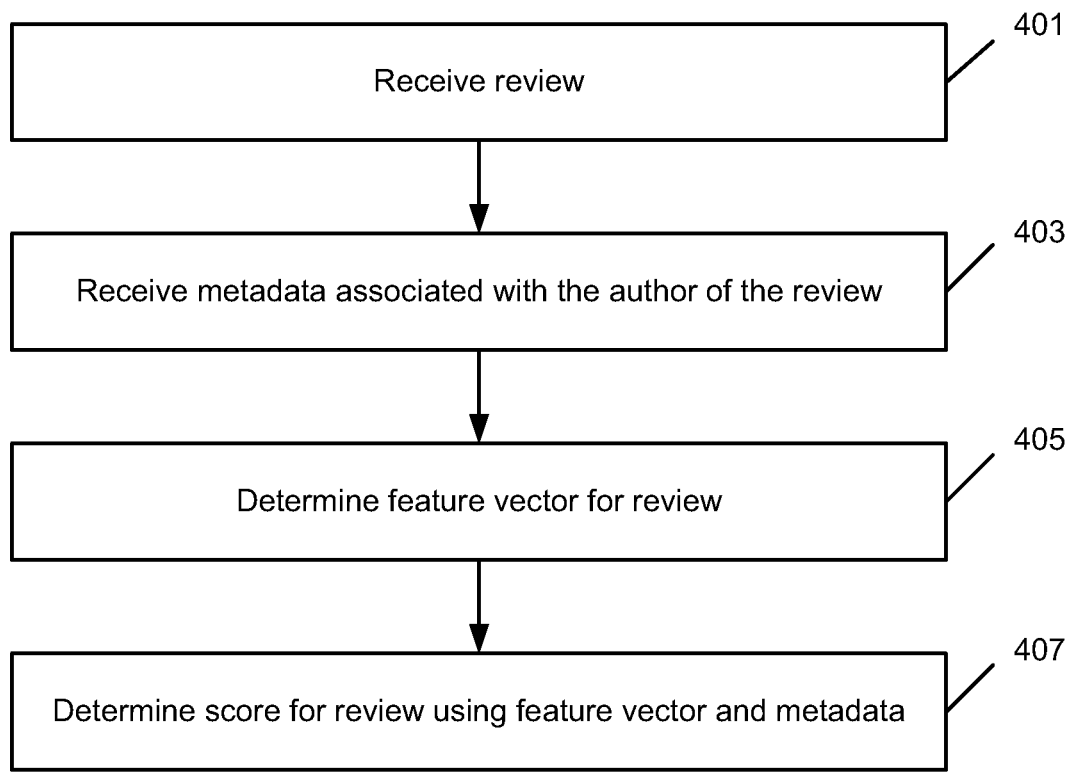
FIG. 4 is an operational flow of an implementation of a process for determining a score for a review.

FIG. 4 is an operational flow of an implementation of a process 400 for determining a score for a review. The process 400 may be implemented by the review scoring engine 130, for example.

A review is received (401). The review may be received by the review scoring engine 130 from the review provider 140. In an implementation, the review may be a newly generated review by an author and/or may be a review that is not part of the set of reviews that were used to train the review scoring model. The review may be a newly generated review from an author at the client 110, for example. Because the review is new, there may not be enough user feedback to determine the quality of the review. Accordingly, the review provider 140 may use the review scoring engine 130 to generate a score for the review.

Metadata associated with the author of the review is received (403). The metadata may be received by the review scoring engine 130 from the review provider 140. The metadata may be associated with the received review and may be part of the review metadata 155 maintained by the review provider 140. The one or more scores of reviews associated with the author of the review may comprise one type of metadata that the review scoring engine 130 may use to determine a score for the review. The metadata may further include social networking data such as the number of friends of the author and/or the average scores of reviews of friends of the author, for example.

In an implementation, the metadata may correspond to the author of the received review and may include social networking data including indicators of the nodes that are connected to a node associated with the author of the received review, for example. The indicators of nodes may be indicators of nodes associated with authors that the author of the review trusts or is friends with, for example.

A feature vector is determined for the review (405). The feature vector may be determined by the text analysis engine 210 and/or the metadata analysis engine 220. In some implementations, the feature vector may only include text features or may include both text and metadata features.

A score for the review is determined based on the feature vector and received metadata (407). The score for the review may be determined by the review scoring engine 130 using the scoring model 135. In implementations where the feature vector includes both text features and metadata features, the review scoring engine 130 may determine the score using the feature vector and the scoring model 135. In an implementation, a score may be generated using the text of the received review, the received metadata, and/or the review scoring model. In implementations where the feature vector only includes text features, the review scoring engine may further apply one or more metadata based constraints to the score generated by the review scoring model 135. The constraints may be based on the received metadata for the review.

The feature vector may be based on text features of the text of the review and/or metadata features from the received metadata, for example. In some implementations, the feature vector may only include text features, and the metadata associated with the review may incorporate the generated score through the application of one or more constraints. The constraints may be based on the received metadata and the metadata associated with the training set of reviews, and may be applied by the review scoring engine 130. The constraints may be based on one or more principles such as a score for a review may be similar to the score of other reviews associated with the author of a review, and/or the score of a review may be similar to the score(s) of reviews associated with authors who the author of the review trusts, for example. Other constraints and constraint principles may be used. By using constraints, reviews lacking metadata or metadata that includes social networking data may be scored using the scoring model using text based features.

In an implementation, the generated score may be associated with the received review. The generated score may be associated with the received review by the review provider 140, for example. In some implementations, the score is associated with the review in such a way that the score is displayed on a webpage associated with the review, or a webpage associated with a product or service that the review purports to review.

Figure 5:
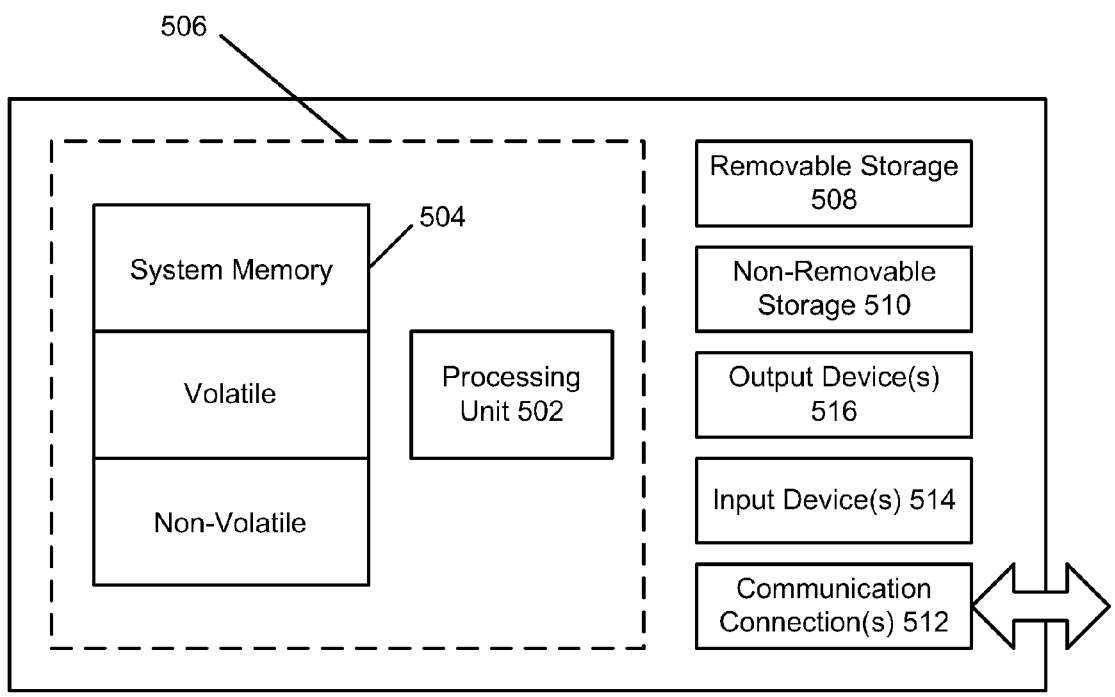
FIG. 5 is a block diagram of a computing system environment according to an implementation of the present system.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving a review at a computer device through a network, wherein the review was generated by an author;
    receiving metadata associated with the author at the computer device through the network, wherein the metadata includes an average score given to reviews generated by the author and an average score given to reviews generated by authors who the author has provided an indicator of trust to, wherein the average score given to the reviews generated by the author is based on scores given to reviews generated by the author, wherein each score given to a review generated by the author is given by an author or user who is not the author of the review;
    determining a feature vector for the review based on the text of the review by the computer device; and
    determining a score for the review based on the determined feature vector and the metadata associated with the author by the computer device, wherein determining the score for the review comprises:
        determining the score for the review using the feature vector and a review scoring model; and
        applying a co-citation constraint to the score for the review by skewing the score for the review towards an average score given to reviews generated by authors who have provided an indicator of trust to the authors who the author has also provided an indicator of trust.

2. The method of claim 1, wherein determining a feature vector for the review comprises performing at least one of a text-statistics based analysis, a syntactic analysis, conformity based analysis, a sentiment based analysis, or a feature based analysis.

3. The method of claim 1, further comprising applying an author consistency constraint, a link consistency constraint, and a trust consistency constraint to the determined score for the review.

4. The method of claim 3, wherein the metadata comprises social networking data.

5. The method of claim 4, wherein the social networking data comprises a number of nodes that are connected to a node associated with the author.

6. The method of claim 1, further comprising associating the determined score with the review.

7. The method of claim 1, further comprising determining one or more features from the metadata.

8. A method comprising:
    receiving a plurality of reviews through a network by a computer device, wherein each review was generated by an author and has an associated score;
    receiving metadata associated with each author of a review from the plurality of reviews through the network by the computer device, wherein the metadata associated with each author includes an average score given to reviews generated by the author and an average score given to reviews generated by authors who the author has provided an indicator of trust to, wherein the average score given to the reviews generated by the author is based on scores given to reviews generated by the author, wherein each score given to a review generated by the author is given by an author or user who is not the author of the review;

determining a feature vector for each review from the plurality of reviews using the received metadata associated with the author of the review and the text of each review by the computer device;

training a review scoring model using the feature vector for each review from the plurality of reviews and the associated scores by the computer device;

receiving a review by the computer device, wherein the review is not a review from the plurality of reviews;

receiving metadata associated with the received review by the computer device;

determining a feature vector for the review by the computer device; and generating a score for the review using the feature vector for the review and the review scoring model by the computer device; and applying a co-citation constraint to the generated score for the review by skewing the score for the review towards an average score given to reviews generated by authors who have provided an indicator of trust to the authors who the author has also provided an indicator of trust.

9. The method of claim 8, further comprising applying an author consistency constraint, a link consistency constraint, and a trust consistency constraint to the generated score for the review.

10. The method of claim 9, wherein the metadata comprises social networking data.

11. The method of claim 8, wherein determining a feature vector for each review from the plurality of reviews comprises determining a value for at least one text feature based on the text of each review.

12. The method of claim 11, wherein the text features comprise one of text-statistics features, syntactic analysis features, conformity based features, sentiment based features, or product features.

13. A system comprising:
at least one computer device;
a review scoring model; and
a review scoring engine adapted to:

receive a plurality of reviews, wherein each review was generated by an author and has an associated score;

receive metadata associated with each author of a review from the plurality of reviews, wherein the metadata associated with each author includes an average score given to reviews generated by the author and an average score given to reviews generated by authors who the author has provided an indicator of trust to, wherein the average score given to the reviews generated by the author is based on scores given to reviews generated by the author, wherein each score given to a review generated by the author is given by an author or user who is not the author of the review;

determine a feature vector for each review from the plurality of reviews using the received metadata associated with the author of the review and the text of each review;

train the review scoring model using the feature vector for each review from the plurality of reviews and the associated scores;

receive a review that is not from the plurality of reviews;

receive metadata associated with the received review;

determine a feature vector for the review;

generate a score for the review using the feature vector for the review and the review scoring model; and apply a co-citation constraint to the generated score by skewing the generated score towards an average score given to reviews generated by authors who have provided an indicator of trust to the authors who the author has also provided an indicator of trust.

14. The system of claim 13, further comprising applying a trust consistency constraint to the generated score, wherein applying the trust consistency constraint comprises skewing the generated score towards the average score given to reviews generated by the authors who the author has provided an indicator of trust to.

15. The system of claim 13, further comprising applying an author consistency constraint and a link consistency constraint to the generated score.

* * * * *